(12) United States Patent
Lu et al.

(10) Patent No.: US 10,212,546 B2
(45) Date of Patent: Feb. 19, 2019

(54) COLLABORATIVE POSITIONING METHOD AND WIRELESS TERMINAL

(71) Applicant: Huawei Technologies Co., Ltd., Shenzhen (CN)

(72) Inventors: Henghui Lu, Beijing (CN); Shuiping Long, Beijing (CN); Zhihao Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/520,779

(22) PCT Filed: Oct. 20, 2014

(86) PCT No.: PCT/CN2014/088959
§ 371 (c)(1),
(2) Date: Apr. 20, 2017

(87) PCT Pub. No.: WO2016/061736
PCT Pub. Date: Apr. 28, 2016

(65) Prior Publication Data
US 2017/0311126 A1 Oct. 26, 2017

(51) Int. Cl.
*H04W 24/00* (2009.01)
*H04W 4/02* (2018.01)
*H04W 64/00* (2009.01)
*H04B 17/318* (2015.01)
(Continued)

(52) U.S. Cl.
CPC .......... *H04W 4/023* (2013.01); *G01S 5/0072* (2013.01); *G01S 5/0252* (2013.01); *G01S 5/0263* (2013.01);
(Continued)

(58) Field of Classification Search
CPC ....... H04W 4/02; H04W 64/00; H04W 4/023; H04W 4/027; H04W 4/08; H04W 4/028;
(Continued)

(56) References Cited

U.S. PATENT DOCUMENTS 8,929,550 B2* 1/2015 Shattil ................. H04W 12/08
380/270
9,213,081 B2 12/2015 Tarlow et al.
(Continued)

FOREIGN PATENT DOCUMENTS

CN 1778138 A 5/2006
CN 102778685 A 11/2012
(Continued)

OTHER PUBLICATIONS

Agre et al.,"A Layered Architecture for Location-based Services in Wireless Ad Hoc Networks", IEEE 2002 Aerospace Conference Proceedings, pp. 1085-1097, Institute of Electrical and Electronics Engineers, New York, New York (Updated Nov. 19, 2001).

*Primary Examiner* — Joseph Arevalo
(74) *Attorney, Agent, or Firm* — Leydig, Voit & Mayer, Ltd.

(57) ABSTRACT

Embodiments of the present disclosure provide a collaborative positioning method and a wireless terminal, includes: generating, by a wireless terminal, positioning request information, where the positioning request information includes a positioning precision parameter; selecting a wireless communications technology according to the positioning precision parameter, where the selected wireless communications technology is a communications manner used by the wireless terminal to perform collaborative positioning; obtaining, by using the selected wireless communications technology, first collaborative positioning information sent by a neighboring terminal, where the first collaborative positioning information includes location information of the neigh-
(Continued)

boring terminal; and calculating, by the wireless terminal, a current location of the wireless terminal according to the location information of the neighboring terminal. The embodiments of the present disclosure resolve a problem that a requirement on hardware of two collaboration parties is relatively strict.

21 Claims, 6 Drawing Sheets

(51) Int. Cl.
*G01S 5/02* (2010.01)
*H04W 4/06* (2009.01)
*G01S 5/00* (2006.01)
*G01S 5/14* (2006.01)

(52) U.S. Cl.
CPC .............. *G01S 5/0289* (2013.01); *G01S 5/14* (2013.01); *H04B 17/318* (2015.01); *H04W 4/06* (2013.01); *H04W 64/00* (2013.01)

(58) Field of Classification Search
CPC ..... H04W 4/029; H04W 4/025; H04W 4/026; H04W 4/22
USPC ............. 455/456.3, 457, 456.1, 456.5, 456.6
See application file for complete search history.

(56) References Cited

U.S. PATENT DOCUMENTS

| | | |
|---|---|---|
| 2004/0214584 A1 | 10/2004 | Marinier |
| 2007/0225016 A1 | 9/2007 | Jendbro et al. |
| 2010/0173592 A1* | 7/2010 | Yamazaki ............ H04B 7/0615 455/69 |
| 2012/0203451 A1 | 8/2012 | Kim et al. |
| 2012/0249372 A1 | 10/2012 | Jovicic et al. |
| 2012/0289243 A1 | 11/2012 | Tarlow et al. |
| 2013/0331125 A1 | 12/2013 | Dini et al. |
| 2014/0045530 A1* | 2/2014 | Gordon ................. H04W 4/029 455/456.2 |
| 2014/0140188 A1* | 5/2014 | Shattil ................. H04L 27/2601 370/208 |
| 2014/0140189 A1* | 5/2014 | Shattil .................... H04B 7/026 370/208 |
| 2015/0230055 A1* | 8/2015 | Smith ................... H04W 4/029 455/456.3 |

FOREIGN PATENT DOCUMENTS

| | | |
|---|---|---|
| CN | 102905363 A | 1/2013 |
| CN | 103444246 A | 12/2013 |
| CN | 103460070 A | 12/2013 |
| EP | 1206152 A2 | 5/2002 |
| EP | 1207404 A1 | 5/2002 |
| WO | 03107708 A1 | 12/2003 |
| WO | 2011099909 A1 | 8/2011 |
| WO | 2012012860 A1 | 2/2012 |
| WO | WO2014/042565 | * 3/2014 |

* cited by examiner

COLLABORATIVE POSITIONING METHOD AND WIRELESS TERMINAL

CROSS-REFERENCE TO RELATED APPLICATIONS

This application is a national stage of International Application No. PCT/CN2014/088959, filed on Oct. 20, 2014, which is hereby incorporated by reference in its entirety.

TECHNICAL FIELD

Embodiments of the present disclosure relate to the communications technologies, and in particular, to a collaborative positioning method and a wireless terminal.

BACKGROUND

With wide application of portable wireless terminals, various location based services (LBS), for example, applications for navigation, local search, location-based advertisement placement, and location-based friend making, need to be implemented by using a positioning function of a wireless terminal. Currently, positioning technologies that are widely used include: global positioning system (GPS) positioning, an assisted GPS (A-GPS), cellular positioning, Wireless-Fidelity (Wi-Fi) positioning, Bluetooth positioning, and the like.

To resolve a technical problem that universally exists in the positioning technologies, for example, a problem that additional costs and power consumption are relatively high because infrastructure or a peripheral device needs to be relied upon in a positioning process, currently, a positioning manner in which information of another node on a wireless network is used, that is, collaborative positioning, is provided. The existing collaborative positioning generally includes: collaborative positioning that is based on information complementation and collaborative positioning that is based on distance measurement. For example, a specific work manner of the collaborative positioning that is based on information complementation is: When information of a to-be-measured terminal is insufficient to implement a positioning function, a particular wireless communications technology such as Wi-Fi or Bluetooth is used. Specifically, both the to-be-measured terminal and a neighboring terminal need to have a particular wireless module, and the particular wireless module needs to be enabled. Supplementary information that the to-be-measured terminal lacks is obtained by means of interaction between the to-be-measured terminal and the neighboring terminal, and then positioning is performed by using the information of the to-be-measured terminal and the supplementary information obtained from the neighboring terminal. In the collaborative positioning that is based on distance measurement, similarly, a particular wireless communications technology is also used, and positioning is implemented by means of communication between the to-be-measured terminal and the neighboring terminal. A difference is that, information obtained by the to-be-measured terminal is location information of the neighboring terminal and distance measurement information between the to-be-measured terminal and the neighboring terminal.

However, in a prior-art collaborative positioning manner of a wireless terminal, collaboration information of a neighboring node is obtained by a to-be-measured terminal by using a particular wireless communications technology, and therefore the two collaboration parties are both required to support the particular wireless communications technology, that is, it is required that the two collaboration parties both need to have a particular wireless module, and the particular wireless module needs to be enabled.

SUMMARY

Embodiments of the present disclosure provide a collaborative positioning method and a wireless terminal, to resolve a problem that a requirement on hardware of two collaboration parties is relatively strict because in a prior-art collaborative positioning manner of a wireless terminal, collaboration information of a neighboring node is obtained by a to-be-measured terminal by using a particular wireless communications technology, and the two collaboration parties are both required to support the particular wireless communications technology.

According to a first aspect, an embodiment of the present disclosure provides a collaborative positioning method, including:

generating, by a wireless terminal, positioning request information, where the positioning request information includes a positioning precision parameter;

selecting, by the wireless terminal, a wireless communications technology according to the positioning precision parameter, where the selected wireless communications technology is a communications manner used by the wireless terminal to perform collaborative positioning;

obtaining, by the wireless terminal by using the selected wireless communications technology, first collaborative positioning information sent by a neighboring terminal, where the first collaborative positioning information includes location information of the neighboring terminal; and calculating, by the wireless terminal, a current location of the wireless terminal according to the location information of the neighboring terminal.

In a first possible implementation manner of the first aspect, a communication range of the selected wireless communications technology is less than a difference between the positioning precision parameter and a preset first precision threshold; and/or the selected wireless communications technology includes a mobile cellular communications technology, a Wireless-Fidelity Wi-Fi technology, or a Bluetooth technology.

According to the first aspect or the first possible implementation manner of the first aspect, in a second possible implementation manner, the first collaborative positioning information further includes a location uncertainty of the neighboring terminal and a signal strength of the first collaborative positioning information, and the calculating, by the wireless terminal, a current location of the wireless terminal according to the location information of the neighboring terminal includes:

calculating, by the wireless terminal according to the location uncertainty of the neighboring terminal and the signal strength of the first collaborative positioning information, a weighting coefficient corresponding to the location information of the neighboring terminal; and determining, by the wireless terminal according to the location information of the neighboring terminal and the corresponding weighting coefficient, that the current location of the wireless terminal is $$l = \sum_{i=0}^{N} \omega_i l_i,$$

where $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

According to the first aspect or the first or second possible implementation manner of the first aspect, in a third possible implementation manner, the positioning request information further includes a positioning latency parameter, and the obtaining, by the wireless terminal by using the selected wireless communications technology, first collaborative positioning information sent by a neighboring terminal includes:

determining, by the wireless terminal, an obtaining manner of the first collaborative positioning information according to the positioning latency parameter; and obtaining, by the wireless terminal, the first collaborative positioning information in the determined obtaining manner by using the selected wireless communications technology, where the obtaining manner includes an active obtaining manner and a passive obtaining manner.

According to the third possible implementation manner of the first aspect, in a fourth possible implementation manner, the determining, by the wireless terminal, an obtaining manner of the first collaborative positioning information according to the positioning latency parameter includes:

when the positioning latency parameter is less than or equal to a preset first latency threshold, determining, by the wireless terminal, that the obtaining manner is the active obtaining manner; and the obtaining, by the wireless terminal, the first collaborative positioning information in the determined obtaining manner by using the selected wireless communications technology includes:

broadcasting, by the wireless terminal, a collaborative positioning request message, so that the neighboring terminal sends a collaborative positioning response message according to the collaborative positioning request message; and receiving, by the wireless terminal, the collaborative positioning response message, where the collaborative positioning response message includes the first collaborative positioning information.

According to the fourth possible implementation manner of the first aspect, in a fifth possible implementation manner, the calculating, by the wireless terminal, a current location of the wireless terminal according to the location information of the neighboring terminal includes:

when the location information of the neighboring terminal included in the first collaborative positioning information is valid, calculating, by the wireless terminal, the current location of the wireless terminal according to the location information of the neighboring terminal; or when the location information of the neighboring terminal included in the first collaborative positioning information is invalid, calculating, by the wireless terminal, the current location of the wireless terminal in a self-positioning manner.

According to the third possible implementation manner of the first aspect, in a sixth possible implementation manner, the determining, by the wireless terminal, an obtaining manner of the first collaborative positioning information according to the positioning latency parameter includes:

when the positioning latency parameter is greater than the first latency threshold, determining, by the wireless terminal, that the obtaining manner is the passive obtaining manner;

the obtaining, by the wireless terminal, the first collaborative positioning information in the determined obtaining manner by using the selected wireless communications technology includes:

listening, by the wireless terminal, to the first collaborative positioning information that is broadcast by the neighboring terminal; and the calculating, by the wireless terminal, a current location of the wireless terminal according to the location information of the neighboring terminal includes:

when the location information of the neighboring terminal included in the first collaborative positioning information is valid, calculating, by the wireless terminal, the current location of the wireless terminal according to the location information of the neighboring terminal; or when the location information of the neighboring terminal included in the first collaborative positioning information is invalid, determining, by the wireless terminal, that the obtaining manner of the first collaborative positioning information is the active obtaining manner, obtaining the first collaborative positioning information in the active obtaining manner by using the selected wireless communications technology, and then determining the current location of the wireless terminal.

According to any one of the first aspect or the first to sixth possible implementation manners of the first aspect, in a seventh possible implementation manner, after the calculating the current location of the wireless terminal, the method further includes:

broadcasting, by the wireless terminal, second collaborative positioning information, where the second collaborative positioning information is used by the neighboring terminal to perform collaborative positioning.

According to any one of the first aspect or the first to seventh possible implementation manners of the first aspect, in an eighth possible implementation manner, the positioning request information further includes an update frequency parameter, and before the selecting, by the wireless terminal, a wireless communications technology according to the positioning precision parameter, the method further includes:

determining, by the wireless terminal according to at least one of the positioning precision parameter, the positioning latency parameter, the update frequency parameter, or a self-positioning capability of the wireless terminal, whether collaborative positioning or self-positioning is to be performed; and the selecting, by the wireless terminal, a wireless communications technology according to the positioning precision parameter includes:

when determining that the collaborative positioning is to be performed, selecting, by the wireless terminal, the wireless communications technology according to the positioning precision parameter.

According to the eighth possible implementation manner of the first aspect, in a ninth possible implementation manner, a condition under which the wireless terminal determines that the collaborative positioning is to be performed includes:

the wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold.

According to a second aspect, an embodiment of the present disclosure provides a wireless terminal, including:

a generating module, configured to generate positioning request information, where the positioning request information includes a positioning precision parameter;

a selection module, configured to select a wireless communications technology according to the positioning precision parameter generated by the generating module, where the selected wireless communications technology is a communications manner used by the wireless terminal to perform collaborative positioning;

an obtaining module, configured to obtain, by using the wireless communications technology selected by the selection module, first collaborative positioning information sent by a neighboring terminal, where the first collaborative positioning information includes location information of the neighboring terminal; and a positioning module, configured to calculate a current location of the wireless terminal according to the location information of the neighboring terminal obtained by the obtaining module.

In a first possible implementation manner of the second aspect, a communication range of the wireless communications technology selected by the selection module is less than a difference between the positioning precision parameter and a preset first precision threshold; and/or the wireless communications technology selected by the selection module includes a mobile cellular communications technology, a Wireless-Fidelity Wi-Fi technology, or a Bluetooth technology.

According to the second aspect or the first possible implementation manner of the second aspect, in a second possible implementation manner, the first collaborative positioning information obtained by the obtaining module further includes a location uncertainty of the neighboring terminal and a signal strength of the first collaborative positioning information, and the positioning module includes:

a weighting calculation unit, configured to calculate, according to the location uncertainty of the neighboring terminal and the signal strength of the first collaborative positioning information that are obtained by the obtaining module, a weighting coefficient corresponding to the location information of the neighboring terminal; and a location calculation unit, configured to determine, according to the location information of the neighboring terminal and the corresponding weighting coefficient, that the current location of the wireless terminal is $$l = \sum_{i=0}^{N} \omega_i l_i,$$

where $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

According to the second aspect or the first or second possible implementation manner of the second aspect, in a third possible implementation manner, the positioning request information generated by the generating module further includes a positioning latency parameter, and the obtaining module includes: a manner determining unit, configured to determine an obtaining manner of the first collaborative positioning information according to the positioning latency parameter generated by the generating module; and an information obtaining unit, configured to obtain the first collaborative positioning information in the obtaining manner determined by the manner determining unit, by using the wireless communications technology selected by the selection module, where the obtaining manner includes an active obtaining manner and a passive obtaining manner.

According to the third possible implementation manner of the second aspect, in a fourth possible implementation manner, the manner determining unit is specifically configured to: when the positioning latency parameter generated by the generating module is less than or equal to a preset first latency threshold, determine that the obtaining manner is the active obtaining manner; and the information obtaining unit is specifically configured to: broadcast a collaborative positioning request message, so that the neighboring terminal sends a collaborative positioning response message according to the collaborative positioning request message; and receive the collaborative positioning response message, where the collaborative positioning response message includes the first collaborative positioning information.

According to the fourth possible implementation manner of the second aspect, in a fifth possible implementation manner, the wireless terminal further includes: a determining module, configured to: before the positioning module calculates the current location of the wireless terminal according to the location information of the neighboring terminal obtained by the obtaining module, determine whether the location information of the neighboring terminal included in the first collaborative positioning information obtained by the obtaining module is valid; and the positioning module is specifically configured to: when the determining module determines that the location information of the neighboring terminal included in the first collaborative positioning information obtained by the obtaining module is valid, calculate the current location of the wireless terminal according to the location information of the neighboring terminal obtained by the obtaining module; or the positioning module is specifically configured to: when the determining module determines that the location information of the neighboring terminal included in the first collaborative positioning information obtained by the obtaining module is invalid, calculate the current location of the wireless terminal in a self-positioning manner.

According to the third possible implementation manner of the second aspect, in a sixth possible implementation manner, the manner determining unit is specifically configured to: when the positioning latency parameter generated by the generating module is greater than the first latency threshold, determine that the obtaining manner is the passive obtaining manner; and the information obtaining unit is specifically configured to listen to the first collaborative positioning information that is broadcast by the neighboring terminal;

the wireless terminal further includes: a determining module, configured to: before the positioning module calculates the current location of the wireless terminal according to the location information of the neighboring terminal obtained by the obtaining module, determine whether the location information of the neighboring terminal included in the first collaborative positioning information obtained by the obtaining module is valid; and the positioning module is specifically configured to: when the determining module determines that the location information of the neighboring terminal included in the first collaborative positioning information obtained by the obtaining module is valid, calculate the current location of the wireless terminal according to the location information of the neighboring terminal obtained by the obtaining module; or the positioning module is specifically configured to: when the determining module determines that the location information of the neighboring terminal included in the first collaborative positioning information obtained by the obtaining module is invalid, determine that the obtaining manner of the first collaborative positioning information is the active obtaining manner, and the obtaining module is further configured to obtain the first collaborative positioning information in the active obtaining manner determined by the positioning module, by using the wireless communications technology selected by the selection module.

According to any one of the second aspect or the first to sixth possible implementation manners of the second aspect, in a seventh possible implementation manner, the wireless terminal further includes: a broadcasting module, configured to: after the positioning module calculates the current location of the wireless terminal, broadcast second collaborative positioning information, where the second collaborative positioning information is used by the neighboring terminal to perform collaborative positioning.

According to any one of the second aspect or the first to seventh possible implementation manners of the second aspect, in an eighth possible implementation manner, the positioning request information generated by the generating module further includes an update frequency parameter, and the determining module is further configured to: before the selection module selects the wireless communications technology, determine, according to at least one of the positioning precision parameter, the positioning latency parameter, or the update frequency parameter generated by the generating module, or a self-positioning capability of the wireless terminal, whether collaborative positioning or self-positioning is to be performed; and the selection module is specifically configured to: when the determining module determines that the collaborative positioning is to be performed, select the wireless communications technology according to the positioning precision parameter generated by the generating module.

According to the eighth possible implementation manner of the second aspect, in a ninth possible implementation manner, a condition under which the determining module determines that the collaborative positioning is to be performed includes:

the wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold.

According to a third aspect, an embodiment of the present disclosure provides a wireless terminal, including:

a processor, configured to generate positioning request information, where the positioning request information includes a positioning precision parameter; and the processor is further configured to select a wireless communications technology according to the positioning precision parameter, where the selected wireless communications technology is a communications manner used by the wireless terminal to perform collaborative positioning;

a receiver, configured to obtain, by using the wireless communications technology selected by the processor, first collaborative positioning information sent by a neighboring terminal, where the first collaborative positioning information includes location information of the neighboring terminal; and a calculator, configured to calculate a current location of the wireless terminal according to the location information of the neighboring terminal obtained by the receiver.

In a first possible implementation manner of the third aspect, a communication range of the wireless communications technology selected by the processor is less than a difference between the positioning precision parameter and a preset first precision threshold; and/or the wireless communications technology selected by the processor includes a mobile cellular communications technology, a Wireless-Fidelity Wi-Fi technology, or a Bluetooth technology.

According to the third aspect or the first possible implementation manner of the third aspect, in a second possible implementation manner, the first collaborative positioning information obtained by the receiver further includes a location uncertainty of the neighboring terminal and a signal strength of the first collaborative positioning information; and the calculator is specifically configured to: calculate, according to the location uncertainty of the neighboring terminal and the signal strength of the first collaborative positioning information that are obtained by the receiver, a weighting coefficient corresponding to the location information of the neighboring terminal; and determine, according to the location information of the neighboring terminal and the corresponding weighting coefficient, that the current location of the wireless terminal is $$l = \sum_{i=0}^{N} \omega_i l_i,$$

where $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

According to the third aspect or the first or second possible implementation manner of the third aspect, in a third possible implementation manner, the positioning request information generated by the processor further includes a positioning latency parameter; and the receiver is specifically configured to: determine an obtaining manner of the first collaborative positioning information according to the positioning latency parameter generated by the processor; and obtain the first collaborative positioning information in the obtaining manner determined by the manner determining unit, by using the wireless communications technology selected by the processor, where the obtaining manner includes an active obtaining manner and a passive obtaining manner.

According to the third possible implementation manner of the third aspect, in a fourth possible implementation manner, the receiver being specifically configured to determine an obtaining manner of the first collaborative positioning information according to the positioning latency parameter generated by the processor specifically includes: when the positioning latency parameter generated by the processor is less than or equal to a preset first latency threshold, determining that the obtaining manner is the active obtaining manner; and accordingly, the wireless terminal further includes: a transmitter, configured to broadcast a collaborative positioning request message, so that the neighboring terminal sends a collaborative positioning response message according to the collaborative positioning request message, and the receiver is configured to receive the collaborative positioning response message, where the collaborative positioning response message includes the first collaborative positioning information.

According to the fourth possible implementation manner of the third aspect, in a fifth possible implementation manner, the processor is further configured to: before the calculator calculates the current location of the wireless terminal according to the location information of the neighboring terminal obtained by the processor, determine whether the location information of the neighboring terminal included in the first collaborative positioning information obtained by the receiver is valid; and the calculator is specifically configured to: when the processor determines that the location information of the neighboring terminal included in the first collaborative positioning information obtained by the receiver is valid, calculate the current location of the wireless terminal according to the location information of the neighboring terminal obtained by the processor; or the calculator is specifically configured to: when the processor determines that the location information of the neighboring terminal included in the first collaborative positioning information obtained by the receiver is invalid, calculate the current location of the wireless terminal in a self-positioning manner.

According to the third possible implementation manner of the third aspect, in a sixth possible implementation manner, the receiver being specifically configured to determine an obtaining manner of the first collaborative positioning information according to the positioning latency parameter generated by the processor specifically includes: when the positioning latency parameter generated by the processor is greater than the first latency threshold, determining that the obtaining manner is the passive obtaining manner; and listening to the first collaborative positioning information that is broadcast by the neighboring terminal;

the processor is further configured to: before the calculator calculates the current location of the wireless terminal according to the location information of the neighboring terminal obtained by the processor, determine whether the location information of the neighboring terminal included in the first collaborative positioning information obtained by the receiver is valid; and the calculator is specifically configured to: when the processor determines that the location information of the neighboring terminal included in the first collaborative positioning information obtained by the receiver is valid, calculate the current location of the wireless terminal according to the location information of the neighboring terminal obtained by the processor; or the calculator is specifically configured to: when the processor determines that the location information of the neighboring terminal included in the first collaborative positioning information obtained by the receiver is invalid, determine that the obtaining manner of the first collaborative positioning information is the active obtaining manner, and the processor is further configured to obtain the first collaborative positioning information in the active obtaining manner determined by the calculator, by using the selected wireless communications technology.

According to any one of the third aspect or the first to sixth possible implementation manners of the third aspect, in a seventh possible implementation manner, the wireless terminal further includes: the transmitter, configured to: after the calculator calculates the current location of the wireless terminal, broadcast second collaborative positioning information, where the second collaborative positioning information is used by the neighboring terminal to perform collaborative positioning.

According to any one of the third aspect or the first to seventh possible implementation manners of the third aspect, in an eighth possible implementation manner, the positioning request information generated by the processor further includes an update frequency parameter, and the processor is further configured to: before selecting the wireless communications technology, determine, according to at least one of the generated positioning precision parameter, positioning latency parameter, or update frequency parameter, or a self-positioning capability of the wireless terminal, whether collaborative positioning or self-positioning is to be performed; and the processor being further configured to select a wireless communications technology according to the generated positioning precision parameter specifically includes: when the processor determines that the collaborative positioning is to be performed, selecting the wireless communications technology according to the generated positioning precision parameter.

According to the eighth possible implementation manner of the third aspect, in a ninth possible implementation manner, a condition under which the processor determines that the collaborative positioning is to be performed includes:

the wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold.

In the collaborative positioning method and the wireless terminal provided in the embodiments of the present disclosure, a wireless terminal generates, according to a currently run application (APP), positioning request information including a positioning precision parameter, so as to select, according to the positioning precision parameter, a wireless communications technology that meets a positioning precision requirement and causes relatively small power consumption, and communicate with a neighboring terminal by using the selected wireless communications technology, to obtain first collaborative positioning information sent by the neighboring terminal, where the first collaborative positioning information includes location information of the neighboring terminal, so that the wireless terminal can calculate a current location of the wireless terminal according to the location information of the neighboring terminal, which resolves a problem that a requirement on hardware of two collaboration parties is relatively strict because in a prior-art collaborative positioning manner, collaboration information of a neighboring node is obtained by a wireless terminal by using a particular wireless communications technology, and the two collaboration parties are both required to support the particular wireless communications technology.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
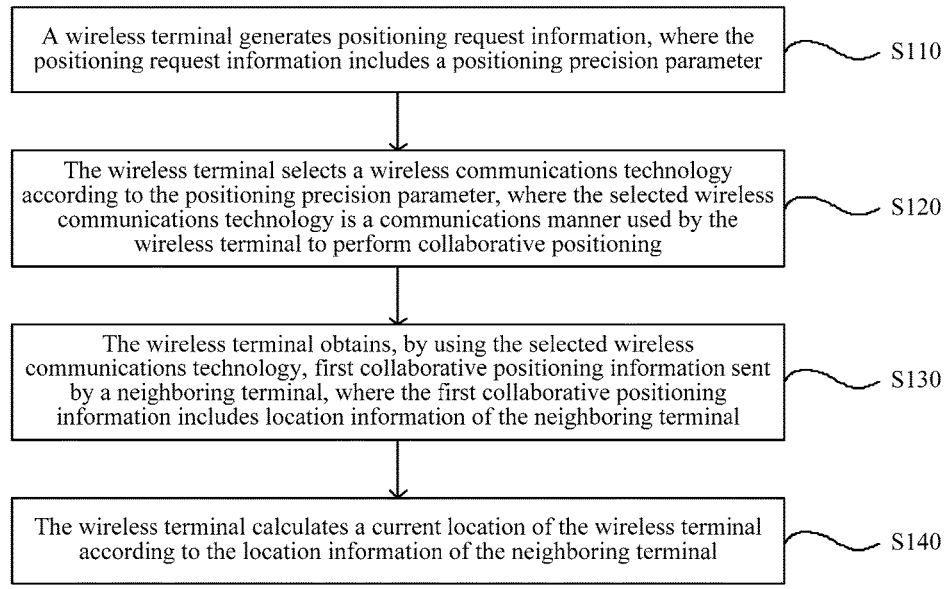
FIG. 1 is a flowchart of a collaborative positioning method according to Embodiment 1 of the present disclosure.

FIG. 1 is a flowchart of a collaborative positioning method according to Embodiment 1 of the present disclosure. The method in this embodiment is applicable to a case in which a wireless terminal performs collaborative positioning. The method may be executed by the wireless terminal. The wireless terminal generally implements the method in a hardware or software manner. The method may be integrated in a memory of the wireless terminal, for example, integrated in a chip of a processor, for invocation and execution by the processor. The method in this embodiment includes the following steps.

S110: The wireless terminal generates positioning request information, where the positioning request information includes a positioning precision parameter.

Currently, a wireless terminal such as a mobile phone or a personal digital assistant (PDA) generally implements various functions by installing APPs. An LBS application needs to be implemented by using a positioning function of the wireless terminal. A positioning technology generally used by the wireless terminal mainly includes GPS positioning, A-GPS, cellular positioning, Wi-Fi positioning, Bluetooth positioning, and the like. In addition, a technology such as magnetic field positioning, infrared positioning, sound wave positioning, light wave positioning, radio frequency identification (RFID), or an inertial navigation system (INS) may also be used for positioning of the wireless terminal. However, all of the foregoing positioning manners rely on infrastructure or peripheral devices, and have a problem such as relatively high additional costs and power consumption.

In this embodiment, when an APP that is currently running in the wireless terminal has a positioning requirement, for example, the APP may be a navigation application, the wireless terminal generates positioning request information according to an actual requirement of the APP on the positioning function, where the positioning request information may specifically include a positioning precision parameter. For example, an outdoor navigation APP generally has a relatively large positioning range, and has a relatively low precision requirement. For another example, an APP for searching for a location inside a mall or an office building has a relatively small positioning range, and generally has a relatively high positioning precision requirement. Therefore, when the wireless terminal generates positioning requests according to different APPs, positioning precision parameters included in positioning request information are also different.

S120: The wireless terminal selects a wireless communications technology according to the positioning precision parameter, where the selected wireless communications technology is a communications manner used by the wireless terminal to perform collaborative positioning.

Figure 2:
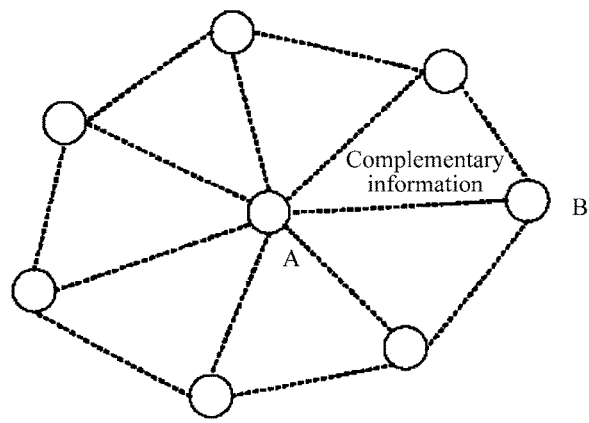
FIG. 2 is a schematic diagram of collaborative positioning of a wireless terminal in the prior art.

To avoid the problem that additional costs and power consumption are relatively high because the foregoing technology such as the GPS positioning, the A-GPS, or the cellular positioning relies on infrastructure or peripheral devices, the prior art puts forward a collaborative positioning manner, namely, positioning by means of interaction between a wireless terminal and a neighboring terminal. For example, generally used collaborative positioning may include collaborative positioning that is based on information complementation, and a work manner of the collaborative positioning that is based on information complementation is specifically: When information of a to-be-measured wireless terminal is insufficient to implement a positioning function, a particular wireless communications technology such as Wi-Fi or Bluetooth is used. Specifically, after accessing a same wireless network, a to-be-measured terminal and a neighboring terminal perform D2D communication, the to-be-measured terminal obtains, by means of interaction with the neighboring terminal, supplementary information that the to-be-measured terminal lacks, and then performs positioning by using a result of self-positioning and collaboration information that is obtained from the neighboring terminal. FIG. 2 is a schematic diagram of collaborative positioning of a wireless terminal in the prior art. For example, when a wireless terminal is on a network using GPS positioning, if a quantity of visible satellites for a to-be-measured node A is less than 3, but a quantity of visible satellites for a neighboring node B of the to-be-measured node A far exceeds 3, the to-be-measured node A may obtain, by communicating with the node B, information that is of another satellite and that the to-be-measured node A needs, to finally ensure successful positioning. It should be noted that, in FIG. 2, circles represent communications nodes, and the to-be-measured node A does not need to know a specific location of a neighboring node of the to-be-measured node A; dotted lines represent communication between nodes, which is used for transmitting complementary information. However, in the specific collaborative positioning manner shown in FIG. 2, collaboration information, which is used for collaborative positioning, of a neighboring node is obtained by a to-be-measured terminal by using a particular wireless communications technology. Therefore, the two collaboration parties are both required to support the particular wireless communications technology; that is, the two collaboration parties both need to have a wireless module that supports the particular wireless communications technology, and the wireless module needs to be enabled. Further, in the collaborative positioning manner shown in FIG. 2, the particular wireless communications technology accessed by the two collaboration parties may not match positioning precision. For example, when a communication range of the wireless communications technology is 5 km, and a positioning precision requirement is 60 m, a search range in a positioning process is relatively large. Consequently, the positioning causes relatively large power consumption and has relatively low accuracy.

In this embodiment, according to the positioning precision parameter that is generated according to the specific requirement of the currently running APP, the to-be-measured wireless terminal selects a proper technology from wireless communications technologies supported by the wireless terminal, such as a cellular communications technology, a Wi-Fi technology, and a Bluetooth technology (a communication range of the cellular technology generally may reach several kilometers, an outdoor communication range of the Wi-Fi technology using 802.11b and 802.11g standards is about 100 meters, and a communication range of the Bluetooth technology is dozens of meters). Then the wireless terminal interacts with a neighboring terminal by using the selected wireless communications technology, to implement collaborative positioning. Precision of the collaborative positioning is limited by a sum of a location uncertainty, that is, a positioning error, and a wireless communication range that are of the neighboring terminal. Therefore, a communication range of the selected wireless communications technology should be less than a difference between the positioning precision parameter a and a first precision threshold $\varepsilon$. That is, the communication range of the selected wireless communications technology is: $d<a-\varepsilon$, where the first precision threshold $\varepsilon$ is set by a system of the wireless terminal according to an actual positioning performance requirement. For example, if the wireless terminal performs indoor positioning, when the positioning precision parameter generated according to the APP is 100 m, the first precision threshold $\varepsilon$ is 20 m, it is required that d<80 m. An indoor communication range of 802.11n is about 70 m, and therefore 802.11n may be used as a candidate wireless communications technology for the collaborative positioning. In other words, in this embodiment, a requirement on the selected wireless communications technology is specifically: The wireless communications technology can meet a positioning precision requirement and causes minimum power consumption.

S130: The wireless terminal obtains, by using the selected wireless communications technology, first collaborative positioning information sent by a neighboring terminal, where the first collaborative positioning information includes location information of the neighboring terminal.

In this embodiment, after selecting the proper wireless communications technology, the wireless terminal needs to communicate with the neighboring terminal to obtain the location information of the neighboring terminal, and use the location information as basic information used by the wireless terminal to perform collaborative positioning. Generally, the neighboring terminal may send first collaborative positioning information by using a broadcast or unicast message, where the broadcast or unicast message includes the location information of the neighboring terminal.

It should be noted that, there may be one or more neighboring terminals in this embodiment. Therefore, in this embodiment, the wireless terminal may obtain one or more pieces of first collaboration information. Any terminal that can communicate with the wireless terminal by using the selected wireless communications technology may be the neighboring terminal in this embodiment. In addition, in this embodiment, both the wireless terminal and the neighboring terminal may perform collaborative positioning. That is, in this embodiment, the wireless terminal and the neighboring terminal may be exchanged.

S140: The wireless terminal calculates a current location of the wireless terminal according to the location information of the neighboring terminal.

In the collaborative positioning method provided in this embodiment, different from the collaborative positioning manner shown in FIG. 2, in the process in which the wireless terminal performs collaborative positioning, the wireless terminal can calculate the current location of the wireless terminal according only to the location information of the neighboring terminal, and the wireless terminal does not need to perform positioning according to information of the wireless terminal and collaboration information obtained from the neighboring terminal. The method shown in FIG. 2 is generally executed by a wireless terminal that has a self-positioning function. However, the collaborative positioning method provided in this embodiment does not limit whether the wireless terminal has the self-positioning function, and lowers a requirement of the collaborative positioning method on hardware of the wireless terminal.

By means of the collaborative positioning method provided in this embodiment, a wireless terminal generates, according to a currently running APP, positioning request information including a positioning precision parameter, so as to select, according to the positioning precision parameter, a wireless communications technology that meets a positioning precision requirement and causes relatively small power consumption, and communicate with a neighboring terminal by using the selected wireless communications technology, to obtain first collaborative positioning information sent by the neighboring terminal, where the first collaborative positioning information includes location information of the neighboring terminal, so that the wireless terminal can calculate a current location of the wireless terminal according to the location information of the neighboring terminal, which resolves a problem that a requirement on hardware of two collaboration parties is relatively strict because in a prior-art collaborative positioning manner, collaboration information of a neighboring node is obtained by a to-be-measured terminal by using a particular wireless communications technology, and the two collaboration parties are both required to support the particular wireless communications technology. Further, in the method provided in this embodiment, the current location of the wireless terminal may be calculated according only to the location information of the neighboring terminal, and therefore the method is applicable to a wireless terminal that does not have a self-positioning capability, and lowers a requirement of the collaborative positioning method on hardware of the wireless terminal.

Optionally, the first collaborative positioning information obtained by the wireless terminal may further include a location uncertainty of the neighboring terminal and a signal strength of the first collaborative positioning information, and then a specific method of calculating the current location by the wireless terminal may be, for example: The wireless terminal calculates, according to the location uncertainty of the neighboring terminal and the signal strength of the first collaborative positioning information, a weighting coefficient ω corresponding to the location information of the neighboring terminal; and determines, according to the location information of the neighboring terminal and the corresponding weighting coefficient, that the current location of the wireless terminal is:

$$l = \sum_{i=0}^{N} \omega_i l_i, \quad (1)$$

In the formula (1), $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

Further, a manner for determining the weighting coefficient $\omega_i$ corresponding to the location information of the $i^{th}$ neighboring terminal may be:

$$\omega_i = \left( \frac{r_i}{\sum_{i=1}^{N} r_i} \times \frac{u_i}{\sum_{i=1}^{N} u_i} \right) \div \left[ \sum_{i=1}^{N} \left( \frac{r_i}{\sum_{i=1}^{N} r_i} \times \frac{u_i}{\sum_{i=1}^{N} u_i} \right) \right] \quad (2)$$

In the formula (2), $r_i$ is a signal strength of first collaborative positioning information sent by the $i^{th}$ neighboring terminal, and $u_i$ is an uncertainty of the location information of the $i^{th}$ neighboring terminal.

In the collaborative positioning method shown in FIG. 2, a volume of information that a to-be-measured wireless terminal needs to exchange is relatively large, which results in that a relatively large quantity of radio resources need to be occupied in a collaborative positioning process. After the information exchange ends, the to-be-measured wireless terminal needs to perform location calculation according to collaboration information obtained by means of the exchange and information of the to-be-measured wireless terminal, which requires that the wireless terminal needs to have a relatively high calculation capability. In addition, the information exchange and the location calculation further cause problems such as a relatively long positioning latency and relatively large energy consumption. Different from the collaborative positioning manner shown in FIG. 2, in the method provided in this embodiment, the location calculation by the wireless terminal is calculating a weighted sum of location information of a neighboring terminal. A weighting coefficient is determined by a location uncertainty of the neighboring terminal and a signal strength of first collaborative positioning information sent by the neighboring terminal. An algorithm is simple in the positioning process, and a wireless terminal that has a relatively low calculation capability can still implement the positioning. Therefore, in the method provided in this embodiment, neither infrastructure needs to be installed, nor a hardware facility that has a relatively high calculation capability needs to be disposed for the wireless terminal, which further reduces costs of hardware of the wireless terminal.

Embodiment 2

Figure 3:
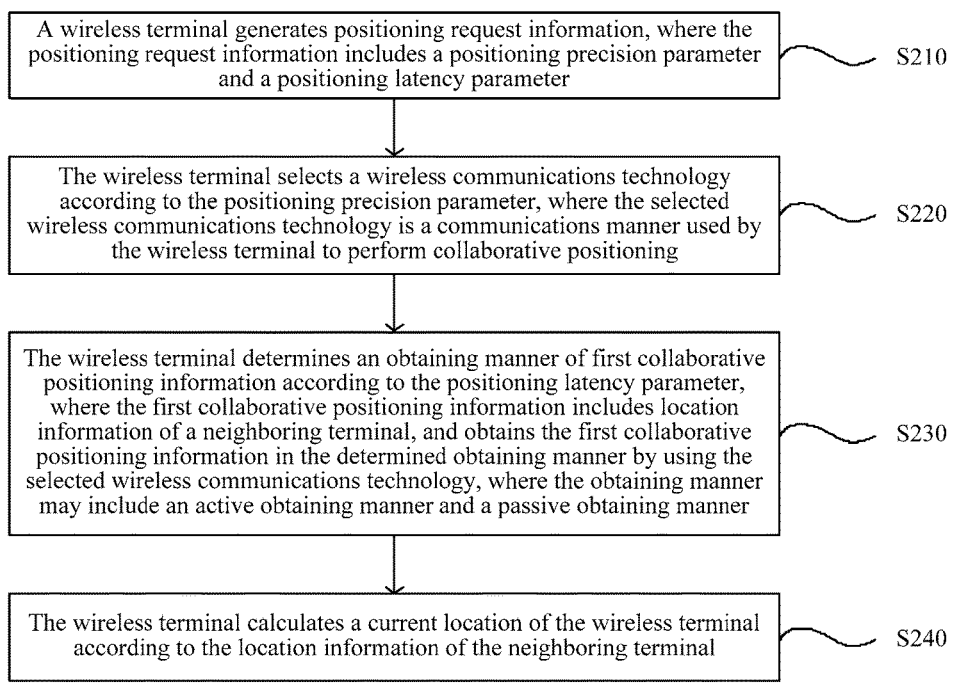
FIG. 3 is a flowchart of a collaborative positioning method according to Embodiment 2 of the present disclosure.

FIG. 3 is a flowchart of a collaborative positioning method according to Embodiment 2 of the present disclosure. This embodiment provides a further description based on the embodiment shown in FIG. 1, and the method provided in this embodiment specifically includes the following steps.

S210: A wireless terminal generates positioning request information, where the positioning request information includes a positioning precision parameter and a positioning latency parameter.

S220: The wireless terminal selects a wireless communications technology according to the positioning precision parameter, where the selected wireless communications technology is a communications manner used by the wireless terminal to perform collaborative positioning.

Specifically, for implementation manners of S210 and S220, refer to S110 and S120 in Embodiment 1.

S230: The wireless terminal determines an obtaining manner of first collaborative positioning information according to the positioning latency parameter, where the first collaborative positioning information includes location information of a neighboring terminal, and obtains the first collaborative positioning information in the determined obtaining manner by using the selected wireless communications technology, where the obtaining manner may include an active obtaining manner and a passive obtaining manner.

In this embodiment, positioning request information obtained by a wireless terminal according to a currently running APP further includes a positioning latency parameter, where the positioning latency parameter reflects a positioning latency requirement of the current APP, and the wireless terminal selects, according to the positioning latency parameter, a specific manner of obtaining first collaborative positioning information that is broadcast by a neighboring terminal, where the manner generally includes an active obtaining manner and a passive obtaining manner. For example, if a value of the positioning latency parameter is relatively small, it indicates that the APP currently running in the wireless terminal has a relatively high positioning latency requirement, and in this case, the active obtaining manner is generally used; if a value of the positioning latency parameter is relatively large, it indicates that the APP currently running in the wireless terminal has a relatively low positioning latency requirement, and the passive obtaining manner may be used. It should be noted that, when a processor of the wireless terminal runs at a limited frequency or occupies relatively large memory space, for example, when the processor of the wireless terminal runs at a relatively low frequency or when a relatively large quantity of programs are currently running and occupy relatively large memory space, a processing manner that is more suitable for a current situation is selected.

S240: The wireless terminal calculates a current location of the wireless terminal according to the location information of the neighboring terminal.

Specifically, for an implementation manner of S240, refer to S140 in Embodiment 1.

By means of the collaborative positioning method provided in this embodiment, a wireless terminal generates, according to a currently running APP, positioning request information including a positioning precision parameter, so as to select, according to the positioning precision parameter, a wireless communications technology that meets a positioning precision requirement and causes relatively small power consumption, and communicate with a neighboring terminal by using the selected wireless communications technology, to obtain first collaborative positioning information sent by the neighboring terminal, where the first collaborative positioning information includes location information of the neighboring terminal, so that the wireless terminal can calculate a current location of the wireless terminal according to the location information of the neighboring terminal, which resolves a problem that a requirement on hardware of two collaboration parties is relatively strict because in a prior-art collaborative positioning manner, collaboration information of a neighboring node is obtained by a to-be-measured terminal by using a particular wireless communications technology, and the two collaboration parties are both required to support the particular wireless communications technology. Further, in the method provided in this embodiment, the current location of the wireless terminal may be calculated according only to the location information of the neighboring terminal, and therefore the method is applicable to a wireless terminal that does not have a self-positioning capability, and lowers a requirement of the collaborative positioning method on hardware of the wireless terminal. In addition, in the method provided in this embodiment, different manners may be selected according to positioning latency requirements of the APP that is currently running in the wireless terminal to obtain the first collaborative positioning information, so as to select, when resources of the wireless terminal are limited, a processing manner that is more suitable for a current situation.

Figure 4:
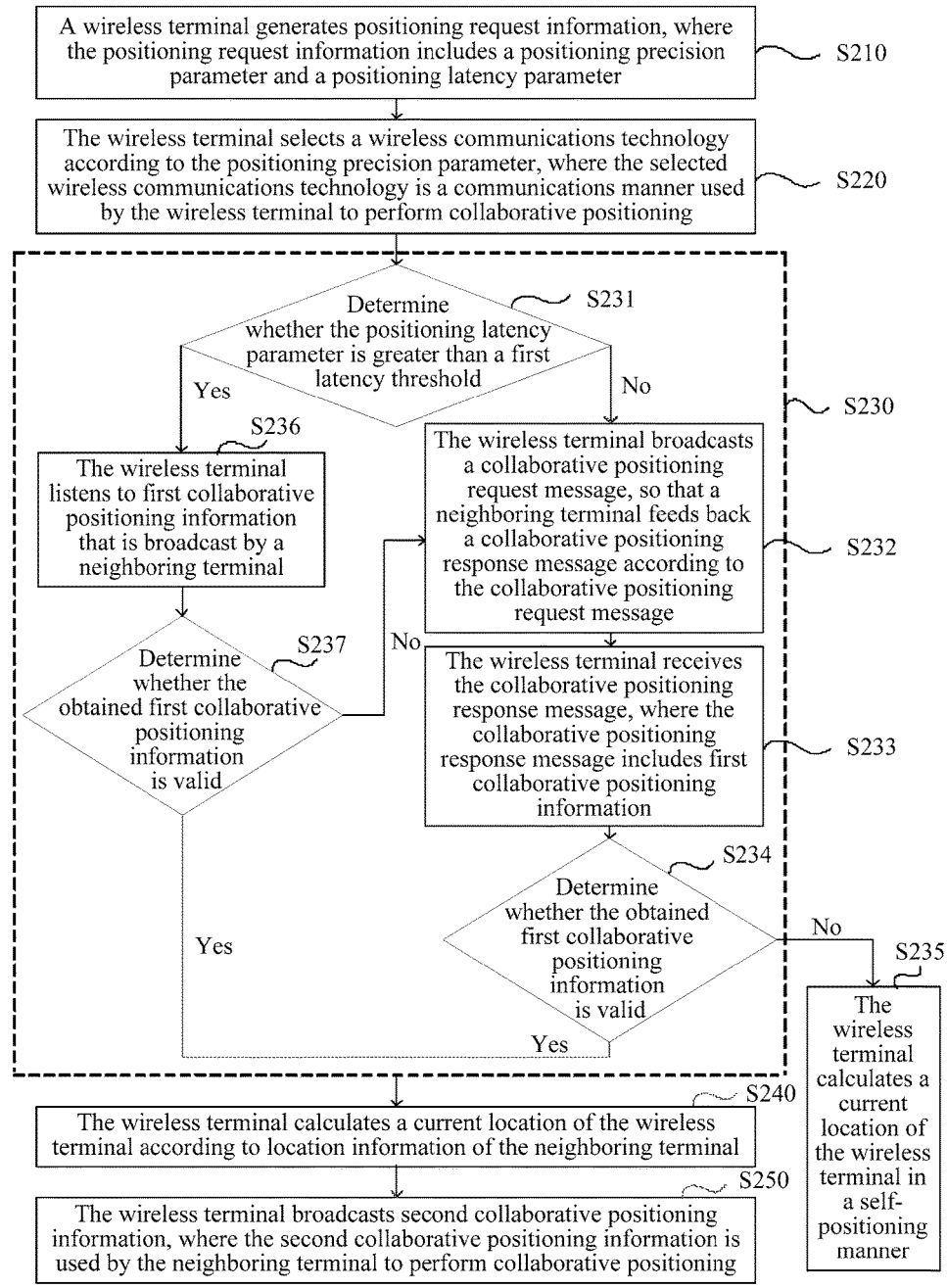
FIG. 4 is a flowchart of another collaborative positioning method according to an embodiment of the present disclosure.

In this embodiment, the determining the specific manner of obtaining the first collaborative positioning information may be, for example: A first latency threshold is preset in a system of the wireless terminal, and the specific manner of obtaining the first collaborative positioning information is determined by comparing the first latency threshold with the positioning latency parameter, where the first latency threshold is preset by the system of the wireless terminal according to an actual positioning performance requirement. FIG. 4 is a flowchart of another collaborative positioning method according to an embodiment of the present disclosure. Based on the embodiment shown in FIG. 3, S230 specifically includes: S231: Determine whether the positioning latency parameter is greater than a first latency threshold. If not, perform S232. If yes, perform S236.

S232: The wireless terminal broadcasts a collaborative positioning request message, so that the neighboring terminal feeds back a collaborative positioning response message according to the collaborative positioning request message.

S233: The wireless terminal receives the collaborative positioning response message, where the collaborative positioning response message includes the first collaborative positioning information.

In an implementation manner of this embodiment, the latency requirement on the collaborative positioning of the wireless terminal is relatively high, and therefore the active obtaining manner may be selected to obtain the first collaboration information sent by the neighboring terminal, that is, the wireless terminal obtains location information, which is used for the collaborative positioning, of the neighboring terminal by actively sending a collaborative positioning request message. In a specific implementation, the wireless terminal performs broadcasting at a frequency within a period of time. For the time and the frequency of the broadcasting, refer to a positioning update frequency and the positioning latency parameter of the currently running APP. For example, the broadcasting frequency may be set to twice the positioning update frequency f, and the time of the broadcasting may be set to one fifth the positioning latency parameter. For example, the positioning latency parameter is 10 s, and a message is broadcast only within the first 2 s, and other work of the collaborative positioning is performed within the next 8 s. The method is generally used by a wireless terminal that performs single-thread processing. For another example, a collaborative positioning message may alternatively be broadcast within the positioning latency parameter. Because an existing wireless terminal generally has a multi-thread processor, the time of the message broadcasting and the time of the positioning may not be distinguished, and the message broadcasting may be ended after the wireless terminal updates the current location, or the message broadcasting may be automatically ended after a time specified by the positioning latency parameter elapses. In the method provided in this embodiment, after sending the collaborative positioning request message, the wireless terminal receives a response message that is fed back by the neighboring terminal, that is, a message that is fed back by the neighboring terminal that can interact with the wireless terminal by using the selected wireless communications technology, where the response message includes the first collaborative positioning information used by the wireless terminal to perform collaborative positioning.

In a specific implementation, the wireless terminal may perform subsequent positioning work according to validity of the obtained information. Specifically, before the current location of the wireless terminal is calculated, S230 further includes: S234: Determine whether the obtained first collaborative positioning information is valid. If yes, perform S240. If not, perform S235.

S235: The wireless terminal calculates a current location of the wireless terminal in a self-positioning manner.

In this embodiment, the validity of the first collaboration information is jointly determined by a location uncertainty u of the neighboring terminal carried in the obtained information, the positioning precision parameter a, and a communication range d of the selected wireless communications technology. For example, when a sum of the location uncertainty and the communication range of the wireless communications technology is greater than the positioning precision parameter, that is, u+d>a, the information is invalid; when a sum of the location uncertainty and the communication range of the wireless communications technology is less than or equal to the positioning precision parameter, that is, u+d≤a, the information is valid. If the information of the neighboring terminal obtained by the wireless terminal is invalid, the collaborative positioning cannot be continued. Therefore, the wireless terminal that has the self-positioning capability may further calculate the current location in the self-positioning manner, which enhances reliability and practicability of the method provided in this embodiment. By means of the method provided in this embodiment, not only the collaborative positioning can be implemented, but also the current location can be determined by using the self-positioning capability when the wireless terminal has a self-defined capability. Therefore, the method provided in this embodiment does not limit an environment in which the wireless terminal performs positioning, and not only can work in an indoor scenario, but also can work in an outdoor scenario. Compared with GPS positioning (which is applicable to an outdoor scenario), Bluetooth positioning (which is applicable to an indoor scenario), or the like, which has a limited application scope, the usage scope is expanded. It should be noted that, if the wireless terminal in this embodiment does not have the self-positioning capability, after it is determined that the first collaborative positioning information is invalid, the current location cannot be calculated by means of self-positioning, and therefore the positioning fails.

S236: The wireless terminal listens to the first collaborative positioning information that is broadcast by the neighboring terminal.

In another implementation manner of this embodiment, the latency requirement on the collaborative positioning of the wireless terminal is relatively low, and therefore the passive obtaining manner may be selected to obtain the first collaboration information sent by the neighboring terminal, that is, the wireless terminal passively listens to information that is broadcast by the neighboring terminal. In the method provided in this embodiment, it is assumed that the neighboring terminal is also a terminal that is performing collaborative positioning. Therefore, the neighboring terminal may actively broadcast the first collaborative positioning information.

Similarly, the wireless terminal may perform subsequent positioning work according to validity of the obtained information. Specifically, before the current location of the wireless terminal is calculated, S230 further includes: S237: Determine whether the obtained first collaborative positioning information is valid. If yes, perform S240. If not, perform S232.

S240: The wireless terminal calculates a current location of the wireless terminal according to the location information of the neighboring terminal. For a specific implementation manner of calculating the current location of the wireless terminal and a beneficial effect in this embodiment, refer to the foregoing embodiment. Therefore, Details are not described herein again.

It should be noted that, in this embodiment, the wireless terminal obtains the location information of the neighboring terminal in the passive obtaining manner. In the passive obtaining manner, the determining of the validity of the first collaboration information is the same as the determining in the active obtaining manner. Therefore, details are not described herein again. In this manner, if the obtained location information for the collaborative positioning is invalid, the wireless terminal may further obtain the location information for the collaborative positioning in the active obtaining manner, that is, determine that the obtaining manner of the first collaborative positioning information is the active obtaining manner, and obtain the first collaborative positioning information in the active obtaining manner by using the selected wireless communications technology.

In this embodiment, when the positioning latency requirement of the APP is relatively low, the passive obtaining manner is used, and when the positioning latency requirement of the APP is relatively high, the active obtaining manner is used. When valid first collaborative positioning information cannot be obtained in the passive obtaining manner for a long time, the wireless terminal may switch to the active obtaining manner. When valid first collaborative positioning information cannot be obtained in the active obtaining manner for a long time, the wireless terminal that has the self-positioning capability can still calculate the current location in the self-positioning manner. The collaborative positioning method provided in this embodiment is universally applicable, and not only can work in a wireless terminal that has a self-positioning function, for example, an existing mobile phone generally having a self-positioning function such as GPS positioning, cellular positioning, or Wi-Fi positioning, but also can work in a wireless terminal that does not have the self-positioning function, for example, a camera that has a Bluetooth, infrared, or Wi-Fi function. For the wireless terminal that has the self-positioning function, when positioning is performed by using the collaborative positioning method provided in this embodiment, a probability of performing the self-positioning function can be reduced, and power consumption is reduced accordingly; and an assistant positioning manner may be further provided when self-positioning fails, to increase reliability of the positioning. In the method provided in this embodiment of the present disclosure, the wireless terminal generally starts the self-positioning that causes relatively high energy consumption, such as the GPS or Wi-Fi positioning, only when the collaborative positioning fails, and in the collaborative positioning process, the wireless terminal selects a wireless communications technology that causes low energy consumption as far as possible to exchange a small amount of information, which can effectively reduce energy consumption in the positioning process.

In a specific implementation, in the method provided in the embodiment shown in FIG. 4, a time when the wireless terminal obtains the first collaborative positioning information may be further limited. Specifically, a time when the wireless terminal obtains, through listening, the first collaborative positioning information that is broadcast by the neighboring terminal and a time when the wireless terminal receives the collaborative positioning response message that is fed back by the neighboring terminal may be limited. Specifically, a time threshold may be set in the system of the wireless terminal. If a timeout occurs, the collaborative positioning may be continued. If a timeout does not occur, the work of obtaining the first collaborative positioning information may be performed repeatedly.

Further, after the current location of the wireless terminal is calculated, that is, after S240, the collaborative positioning method provided in this embodiment further includes: S250: The wireless terminal broadcasts second collaborative positioning information, where the second collaborative positioning information is used by the neighboring terminal to perform collaborative positioning. In the collaborative positioning method provided in this embodiment, both the wireless terminal and the neighboring terminal may be terminals that need to perform collaborative positioning. After the wireless terminal implements the collaborative positioning and the current location of the wireless terminal is updated, the wireless terminal may broadcast the second collaborative positioning information at a frequency within a period of time. For a method of setting a frequency and a time for broadcasting the second collaborative positioning information, refer to the method of setting the frequency and the time for broadcasting the collaborative positioning request message.

Embodiment 3

Figure 5:
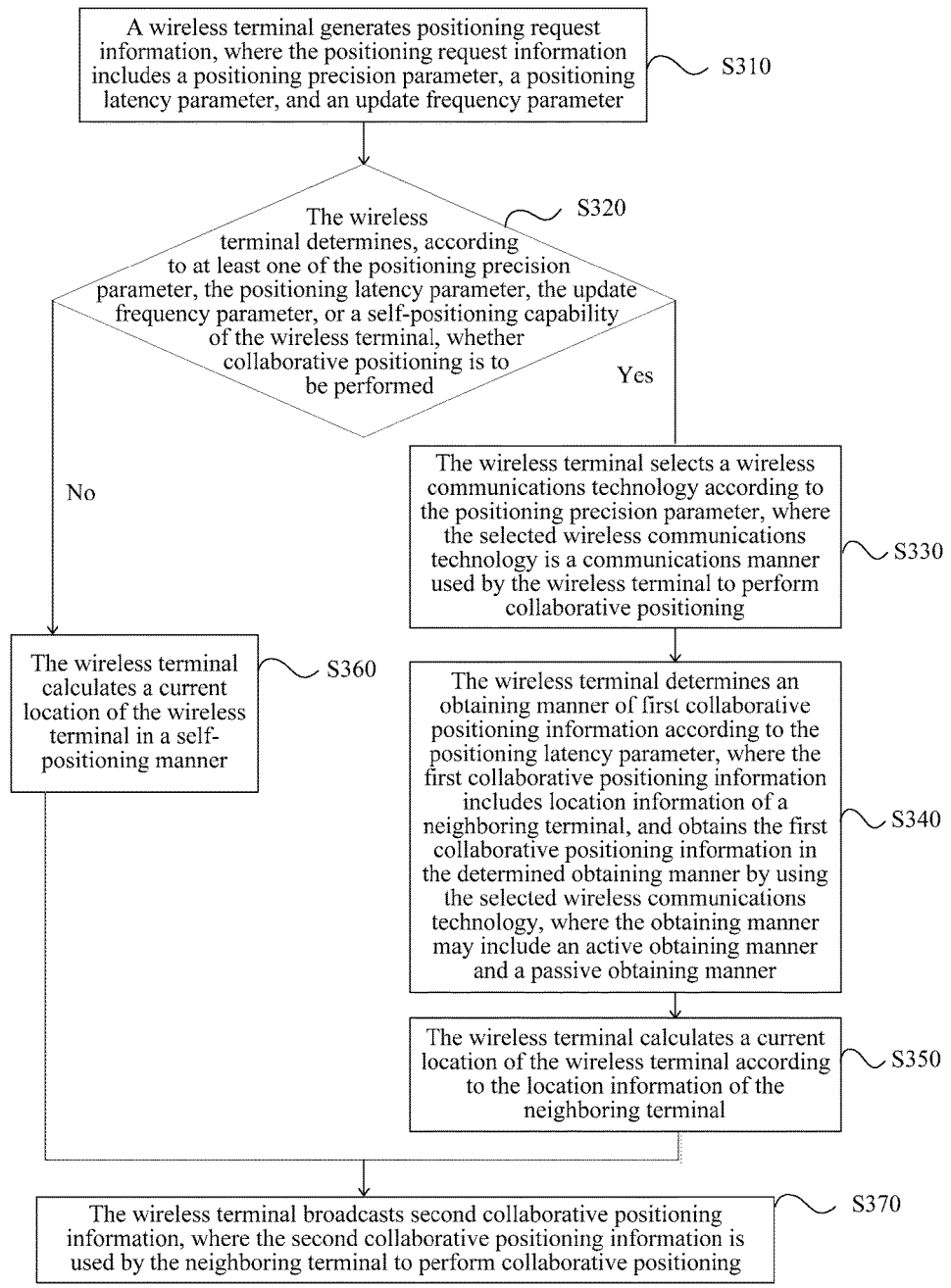
FIG. 5 is a flowchart of a collaborative positioning method according to Embodiment 3 of the present disclosure.

FIG. 5 is a flowchart of a collaborative positioning method according to Embodiment 3 of the present disclosure. The method provided in this embodiment specifically includes the following steps.

S310: A wireless terminal generates positioning request information, where the positioning request information includes a positioning precision parameter, a positioning latency parameter, and an update frequency parameter.

In this embodiment, positioning request information that is generated by a wireless terminal according to a positioning requirement of a currently running APP further specifically includes an update frequency parameter.

S320: The wireless terminal determines, according to at least one of the positioning precision parameter, the positioning latency parameter, the update frequency parameter, or a self-positioning capability of the wireless terminal, whether collaborative positioning is to be performed. If yes, perform S330. If not, perform S360.

S330: The wireless terminal selects a wireless communications technology according to the positioning precision parameter, where the selected wireless communications technology is a communications manner used by the wireless terminal to perform collaborative positioning.

S340: The wireless terminal determines an obtaining manner of first collaborative positioning information according to the positioning latency parameter, where the first collaborative positioning information includes location information of a neighboring terminal, and obtains the first collaborative positioning information in the determined obtaining manner by using the selected wireless communications technology, where the obtaining manner may include an active obtaining manner and a passive obtaining manner.

S350: The wireless terminal calculates a current location of the wireless terminal according to the location information of the neighboring terminal.

Specifically, for implementation manners of S330 to S350, refer to S220 to S240 in Embodiment 2.

S360: The wireless terminal calculates a current location of the wireless terminal in a self-positioning manner.

By means of the collaborative positioning method provided in this embodiment, the wireless terminal may choose, according to a specific requirement of the currently running APP, whether to perform collaborative positioning or self-positioning, and advantages and limitations of the collaborative positioning and the self-positioning can be comprehensively considered, to provide a positioning manner that is more suitable for the APP that is currently running in the wireless terminal.

In a specific implementation, a condition under which the wireless terminal determines that the collaborative positioning is to be performed may include: The wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold. It should be noted that, when the wireless terminal determines that the collaborative positioning is to be performed, requirements on the positioning precision parameter, the positioning latency parameter, and the update frequency parameter are in an "and" relationship. In other words, when the wireless terminal has the self-positioning capability, as long as the positioning precision parameter is less than or equal to the second precision threshold, the positioning latency parameter is less than or equal to the second latency threshold, or the update frequency parameter is greater than the frequency threshold, the wireless terminal determines that the self-positioning is to be performed.

S370: The wireless terminal broadcasts second collaborative positioning information, where the second collaborative positioning information is used by the neighboring terminal to perform collaborative positioning.

In this embodiment, in both S350 and S360, the current location of the wireless terminal can be calculated, and the only difference is that different positioning manners are used. Therefore, after S350 or S360, S370 may be performed. It should be noted that, for a specific manner when the wireless terminal performs S340 in this embodiment, also refer to S230 in the embodiment shown in FIG. 4. A specific implementation manner is the same as that in the embodiment shown in FIG. 4. Therefore, details are not described herein again.

In the method provided in this embodiment, the collaborative positioning and self-positioning manners can also be selectively used. When the collaborative positioning fails or the self-positioning fails, the wireless terminal switches to the other positioning manner. When the collaborative positioning is performed, the active obtaining manner or the passive obtaining manner may be selected to obtain the first collaborative positioning information that is broadcast by the neighboring terminal. That is, a beneficial effect of this embodiment is the same as that of the foregoing embodiment. Therefore, details are not described herein again.

Embodiment 4

Figure 6:
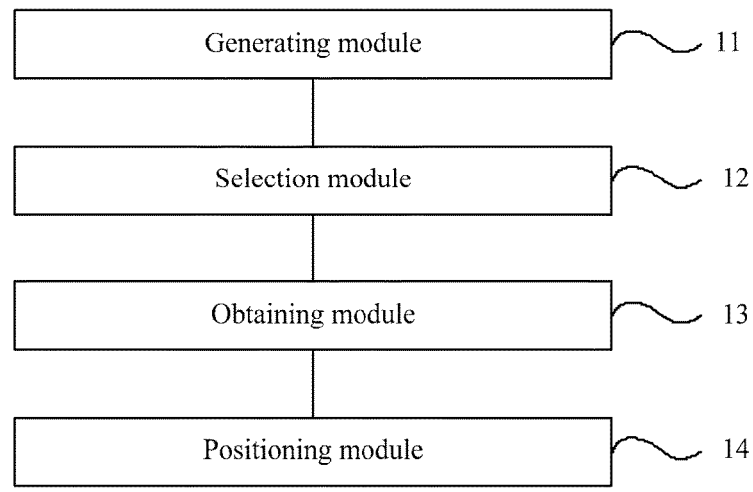
FIG. 6 is a schematic structural diagram of a wireless terminal according to Embodiment 4 of the present disclosure.

FIG. 6 is a schematic structural diagram of a wireless terminal according to Embodiment 4 of the present disclosure. The wireless terminal provided in this embodiment specifically includes: a generating module 11, a selection module 12, an obtaining module 13, and a positioning module 14.

The generating module 11 is configured to generate positioning request information, where the positioning request information includes a positioning precision parameter.

For example, the wireless terminal in this embodiment may be a mobile phone or a PDA. When a currently running APP has a positioning requirement, for example, the APP may be a navigation application, the generating module 11 of the wireless terminal generates positioning request information according to an actual requirement of the APP on a positioning function.

The selection module 12 is configured to select a wireless communications technology according to the positioning precision parameter generated by the generating module 11, where the selected wireless communications technology is a communications manner used by the wireless terminal to perform collaborative positioning.

In this embodiment, according to the positioning precision parameter that is generated according to the specific requirement of the currently running APP, the selection module 12 of the to-be-positioned wireless terminal selects a proper technology from wireless communications technologies supported by the wireless terminal, such as a cellular communications technology, a Wi-Fi technology, and a Bluetooth technology. For example, a communication range of the wireless communications technology selected by the selection module 12 is less than a difference between the positioning precision parameter and a preset first precision threshold.

The obtaining module 13 is configured to obtain, by using the wireless communications technology selected by the selection module 12, first collaborative positioning information sent by a neighboring terminal, where the first collaborative positioning information includes location information of the neighboring terminal.

It should be noted that, there may be one or more neighboring terminals in this embodiment. Therefore, in this embodiment, the wireless terminal may obtain one or more pieces of first collaboration information. Any terminal that can communicate with the wireless terminal by using the selected wireless communications technology may be the neighboring terminal in this embodiment. In addition, in this embodiment, both the wireless terminal and the neighboring terminal may perform collaborative positioning. That is, in this embodiment, the wireless terminal and the neighboring terminal may be exchanged.

The positioning module 14 is configured to calculate a current location of the wireless terminal according to the location information of the neighboring terminal obtained by the obtaining module 13.

In the collaborative positioning process, the wireless terminal provided in this embodiment can calculate the current location of the wireless terminal according only to the location information of the neighboring terminal. Therefore, whether the wireless terminal has the self-positioning function is not limited, which lowers a requirement of a collaborative positioning method on hardware of the wireless terminal.

The wireless terminal provided in this embodiment of the present disclosure is configured to execute the collaborative positioning method provided in the embodiment shown in FIG. 1 in the present disclosure, and has corresponding functional modules. The implementation principles and technical effects thereof are similar. Details are not described herein again.

Optionally, in the wireless terminal provided in this embodiment, the first collaborative positioning information obtained by the obtaining module 13 may further include a location uncertainty of the neighboring terminal and a signal strength of the first collaborative positioning information. Accordingly, the positioning module 14 includes: a weighting calculation unit and a location calculation unit, where the weighting calculation unit is configured to calculate, according to the location uncertainty of the neighboring terminal and the signal strength of the first collaborative positioning information that are obtained by the obtaining module 13, a weighting coefficient corresponding to the location information of the neighboring terminal; and the location calculation unit is configured to: determine, according to the location information of the neighboring terminal and the corresponding weighting coefficient, that the current location of the wireless terminal is:

$$l = \sum_{i=0}^{N} \omega_i l_i,$$

where $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

In the wireless terminal provided in this embodiment, an operational processing algorithm in the collaborative positioning process is simple, and a wireless terminal that has a relatively low calculation capability can still implement the positioning. Neither infrastructure needs to be installed, nor a hardware facility that has a relatively high calculation capability needs to be disposed for the wireless terminal, which further reduces costs of hardware of the wireless terminal.

Embodiment 5

Figure 7:
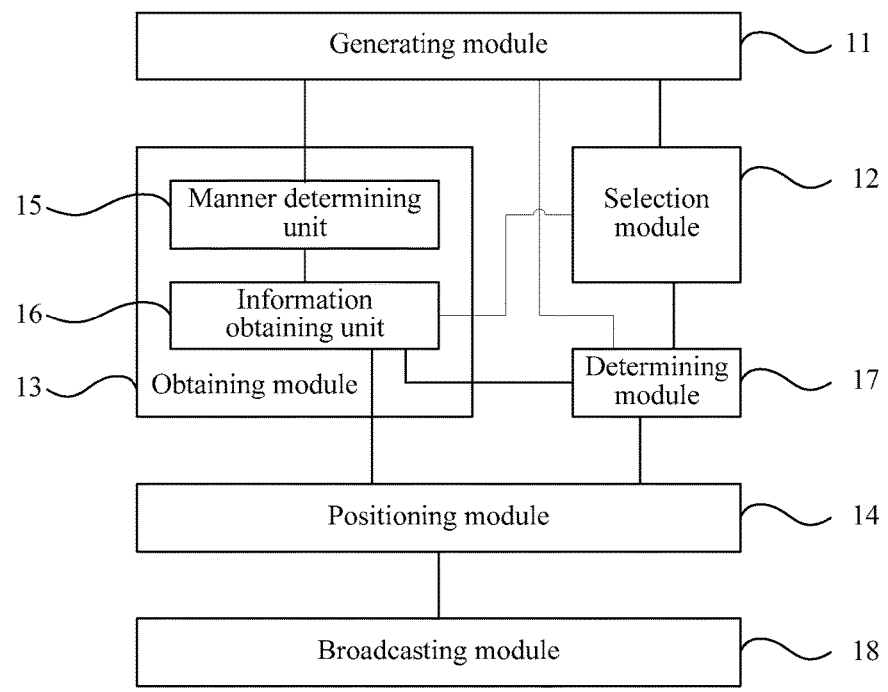
FIG. 7 is a schematic structural diagram of a wireless terminal according to Embodiment 5 of the present disclosure.

FIG. 7 is a schematic structural diagram of a wireless terminal according to Embodiment 5 of the present disclosure. As shown in FIG. 7, the wireless terminal provided in this embodiment is based on the structure of the terminal shown in FIG. 6. In this embodiment, the positioning request information generated by the generating module 11 may further include a positioning latency parameter. Accordingly, the obtaining module 13 may include: a manner determining unit 15, configured to determine an obtaining manner of the first collaborative positioning information according to the positioning latency parameter generated by the generating module 11; and an information obtaining unit 16, configured to obtain the first collaborative positioning information in the obtaining manner determined by the manner determining unit 15, by using the wireless communications technology selected by the selection module 12, where the obtaining manner includes an active obtaining manner and a passive obtaining manner.

It should be noted that, when a processor of the wireless terminal runs at a limited frequency or occupies relatively large memory space, for example, when the processor of the wireless terminal runs at a relatively low frequency or when a relatively large quantity of programs are currently running and occupy relatively large memory space, the wireless terminal provided in this embodiment may select, when executing a collaborative positioning method, a processing manner that is more suitable for a current situation.

In a specific implementation, the determining the obtaining manner of the first collaborative positioning information may be, for example: A first latency threshold is preset in a system of the wireless terminal provided in this embodiment, and the specific manner of obtaining the first collaborative positioning information is determined by comparing the first latency threshold with the positioning latency parameter, where the first latency threshold is preset by the system of the wireless terminal according to an actual positioning performance requirement. Optionally, in an implementation manner in this embodiment, a latency requirement on the collaborative positioning of the wireless terminal is relatively high, and the manner determining unit 15 is specifically configured to: when the positioning latency parameter generated by the generating module 11 is less than or equal to the preset first latency threshold, determine that the obtaining manner is the active obtaining manner.

Accordingly, the information obtaining unit 16 is specifically configured to: broadcast a collaborative positioning request message, so that the neighboring terminal sends a collaborative positioning response message according to the collaborative positioning request message; and receive the collaborative positioning response message, where the collaborative positioning response message includes the first collaborative positioning information.

In a specific implementation of this embodiment, the wireless terminal may further perform subsequent positioning work according to validity of the obtained information. Specifically, the wireless terminal provided in this embodiment further includes: a determining module 17, configured to: before the positioning module 14 calculates the current location of the wireless terminal according to the location information of the neighboring terminal obtained by the obtaining module 13, determine whether the location information of the neighboring terminal included in the first collaborative positioning information obtained by the obtaining module 13 is valid. Accordingly, the positioning module 14 is specifically configured to: when the determining module 17 determines that the location information of the neighboring terminal included in the first collaborative positioning information obtained by the obtaining module 13 is valid, calculate the current location of the wireless terminal according to the location information of the neighboring terminal obtained by the obtaining module 13; or the positioning module 14 is specifically configured to: when the determining module 17 determines that the location information of the neighboring terminal included in the first collaborative positioning information obtained by the obtaining module 13 is invalid, calculate the current location of the wireless terminal in a self-positioning manner.

Optionally, in another implementation manner of this embodiment, the latency requirement on the collaborative positioning of the wireless terminal is relatively low, and the manner determining unit 15 is specifically configured to: when the positioning latency parameter generated by the generating module 11 is greater than the first latency threshold, determine that the obtaining manner is the passive obtaining manner. Accordingly, the information obtaining unit 16 is specifically configured to listen to the first collaborative positioning information that is broadcast by the neighboring terminal.

Similarly, in a specific implementation of this embodiment, the wireless terminal may perform subsequent positioning work according to validity of the obtained information, and a manner of determining, by the determining module 17, whether the location information of the neighboring terminal is valid in this embodiment is similar to that in the foregoing embodiment, and the determining is performed before the positioning module 14 calculates the current location of the wireless terminal. Accordingly, the positioning module 14 is specifically configured to: when the determining module 17 determines that the location information of the neighboring terminal included in the first collaborative positioning information obtained by the obtaining module 13 is valid, calculate the current location of the wireless terminal according to the location information of the neighboring terminal obtained by the obtaining module 13; or the positioning module 14 is specifically configured to: when the determining module 17 determines that the location information of the neighboring terminal included in the first collaborative positioning information obtained by the obtaining module 13 is invalid, determine that the obtaining manner of the first collaborative positioning information is the active obtaining manner, and the obtaining module 13 in this embodiment is further configured to obtain the first collaborative positioning information in the active obtaining manner determined by the positioning module 14, by using the wireless communications technology selected by the selection module 12.

In a specific implementation, in this embodiment, a time when the wireless terminal obtains the first collaborative positioning information may be further limited. Specifically, a time when the wireless terminal obtains, through listening, the first collaborative positioning information that is broadcast by the neighboring terminal and a time when the wireless terminal receives the collaborative positioning response message that is fed back by the neighboring terminal may be limited. Specifically, a time threshold may be set in the system of the wireless terminal. If a timeout occurs, the collaborative positioning may be continued. If a timeout does not occur, the work of obtaining the first collaborative positioning information may be performed repeatedly.

Further, the wireless terminal provided in this embodiment may further include: a broadcasting module 18, configured to: after the positioning module 14 calculates the current location of the wireless terminal, broadcast second collaborative positioning information, where the second collaborative positioning information is used by the neighboring terminal to perform collaborative positioning.

Still further, based on the foregoing embodiment, in the wireless terminal provided in this embodiment, the positioning request information generated by the generating module 11 may further include an update frequency parameter, and the determining module 17 is further configured to: before the selection module 12 selects the wireless communications technology, determine, according to at least one of the positioning precision parameter, the positioning latency parameter, or the update frequency parameter generated by the generating module 11, or a self-positioning capability of the wireless terminal, whether collaborative positioning or self-positioning is to be performed. Accordingly, the selection module 12 is specifically configured to: when the determining module 17 determines that the collaborative positioning is to be performed, select the wireless communications technology according to the positioning precision parameter generated by the generating module.

The wireless terminal provided in this embodiment may choose, according to a specific requirement of the currently running APP, whether to perform collaborative positioning or self-positioning, and advantages and limitations of the collaborative positioning and the self-positioning can be comprehensively considered, to provide a positioning manner that is more suitable for the APP that is currently running in the wireless terminal.

In a specific implementation, a condition under which the determining module 17 determines that the collaborative positioning is to be performed may include: The wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold. It should be noted that, when the wireless terminal determines that the collaborative positioning is to be performed, requirements on the positioning precision parameter, the positioning latency parameter, and the update frequency parameter are in an "and" relationship; in other words, when the wireless terminal has the self-positioning capability, as long as the positioning precision parameter is less than or equal to the second precision threshold, the positioning latency parameter is less than or equal to the second latency threshold, or the update frequency parameter is greater than the frequency threshold, the wireless terminal determines that the self-positioning is to be performed.

The wireless terminal provided in this embodiment of the present disclosure is configured to execute the collaborative positioning methods provided in the embodiments shown in FIG. 3 to FIG. 5 in the present disclosure, and has corresponding functional modules. The implementation principles and technical effects thereof are similar. Details are not described herein again.

Embodiment 6

Figure 8:
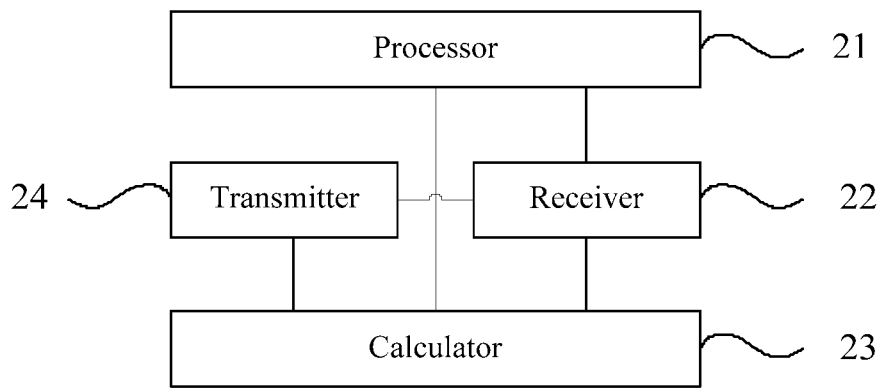
FIG. 8 is a schematic structural diagram of a wireless terminal according to Embodiment 6 of the present disclosure.

FIG. 8 is a schematic structural diagram of a wireless terminal according to Embodiment 6 of the present disclosure. The wireless terminal provided in this embodiment specifically includes: a processor 21, a receiver 22, and a calculator 23.

The processor 21 is configured to generate positioning request information, where the positioning request information includes a positioning precision parameter.

For example, the wireless terminal in this embodiment may be a mobile phone or a PDA. When a currently running APP has a positioning requirement, for example, the APP may be a navigation application, the processor 21 of the wireless terminal generates positioning request information according to an actual requirement of the APP on a positioning function.

The processor 21 is further configured to select a wireless communications technology according to the positioning precision parameter, where the selected wireless communications technology is a communications manner used by the wireless terminal to perform collaborative positioning.

In this embodiment, according to the positioning precision parameter generated according to the specific requirement of the currently running APP, the processor 21 of the to-be-positioned wireless terminal selects a proper technology from wireless communications technologies supported by the wireless terminal, such as a cellular communications technology, a Wi-Fi technology, and a Bluetooth technology. For example, a communication range of the wireless communications technology selected by the processor 21 is less than a difference between the positioning precision parameter and a preset first precision threshold.

The processor 21 is further configured to obtain, by using the selected wireless communications technology, first collaborative positioning information sent by a neighboring terminal, where the first collaborative positioning information includes location information of the neighboring terminal.

It should be noted that, there may be one or more neighboring terminals in this embodiment. Therefore, in this embodiment, the wireless terminal may obtain one or more pieces of first collaboration information. Any terminal that can communicate with the wireless terminal by using the selected wireless communications technology may be the neighboring terminal in this embodiment. In addition, in this embodiment, both the wireless terminal and the neighboring terminal may perform collaborative positioning. That is, in this embodiment, the wireless terminal and the neighboring terminal may be exchanged.

The calculator 23 is configured to calculate a current location of the wireless terminal according to the location information of the neighboring terminal obtained by the receiver 22

In the collaborative positioning process, the wireless terminal provided in this embodiment can calculate the current location of the wireless terminal according only to the location information of the neighboring terminal. Therefore, whether the wireless terminal has the self-positioning function is not limited, which lowers a requirement of a collaborative positioning method on hardware of the wireless terminal.

The wireless terminal provided in this embodiment of the present disclosure is configured to execute the collaborative positioning method provided in the embodiment shown in FIG. 1 in the present disclosure, and has corresponding physical apparatuses. The implementation principles and technical effects thereof are similar. Details are not described herein again.

Optionally, in the wireless terminal provided in this embodiment, the first collaborative positioning information obtained by the receiver 22 may further include a location uncertainty of the neighboring terminal and a signal strength of the first collaborative positioning information. Accordingly, the calculator 23 is specifically configured to: calculate, according to the location uncertainty of the neighboring terminal and the signal strength of the first collaborative positioning information that are obtained by the receiver 22, a weighting coefficient corresponding to the location information of the neighboring terminal; and determine, according to the location information of the neighboring terminal and the corresponding weighting coefficient, that the current location of the wireless terminal is:

$$l = \sum_{i=0}^{N} \omega_i l_i,$$

where $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

In the wireless terminal provided in this embodiment, an operational processing algorithm in the collaborative positioning process is simple, and a wireless terminal that has a relatively low calculation capability can still implement the positioning. Neither infrastructure needs to be installed, nor a hardware facility that has a relatively high calculation capability needs to be disposed for the wireless terminal, which further reduces costs of hardware of the wireless terminal.

In the wireless terminal provided in this embodiment, the positioning request information generated by the processor 21 may further include a positioning latency parameter. Accordingly, the receiver 22 is specifically configured to: determine an obtaining manner of the first collaborative positioning information according to the positioning latency parameter generated by the processor 21; and obtain the first collaborative positioning information in the determined obtaining manner by using the wireless communications technology selected by the processor 21, where the obtaining manner may include an active obtaining manner and a passive obtaining manner.

It should be noted that, when a processor of the wireless terminal runs at a limited frequency or occupies relatively large memory space, for example, when the processor of the wireless terminal runs at a relatively low frequency or when a relatively large quantity of programs are currently running and occupy relatively large memory space, the wireless terminal provided in this embodiment may select, when executing a collaborative positioning method, a processing manner that is more suitable for a current situation.

In a specific implementation, the determining the obtaining manner of the first collaborative positioning information may be, for example: A first latency threshold is preset in a system of the wireless terminal provided in this embodiment, and the specific manner of obtaining the first collaborative positioning information is determined by comparing the first latency threshold with the positioning latency parameter, where the first latency threshold is preset by the system of the wireless terminal according to an actual positioning performance requirement. Optionally, in an implementation manner in this embodiment, a latency requirement on the collaborative positioning of the wireless terminal is relatively high, and the wireless terminal provided in the embodiment shown in FIG. 8 further includes a transmitter 24. The receiver 22 being specifically configured to determine an obtaining manner of the first collaborative positioning information according to the positioning latency parameter generated by the processor 21 specifically includes: when the positioning latency parameter generated by the processor 21 is less than or equal to the preset first latency threshold, determining that the obtaining manner is the active obtaining manner. Accordingly, the transmitter 24 is configured to broadcast a collaborative positioning request message, so that the neighboring terminal sends a collaborative positioning response message according to the collaborative positioning request message, and the receiver 22 is configured to receive the collaborative positioning response message, where the collaborative positioning response message includes the first collaborative positioning information.

In a specific implementation of this embodiment, the wireless terminal may further perform subsequent positioning work according to validity of the obtained information. Specifically, in the wireless terminal provided in this embodiment, the processor 21 is further configured to: before the calculator 23 calculates the current location of the wireless terminal according to the location information of the neighboring terminal obtained by the receiver 22, determine whether the location information of the neighboring terminal included in the first collaborative positioning information obtained by the receiver 22 is valid. Accordingly, the calculator 23 is specifically configured to: when the processor 21 determines that the location information of the neighboring terminal included in the first collaborative positioning information obtained by the receiver 22 is valid, calculate the current location of the wireless terminal according to the location information of the neighboring terminal obtained by the receiver 22; or the calculator 23 is specifically configured to: when the processor 21 determines that the location information of the neighboring terminal included in the first collaborative positioning information obtained by the receiver 22 is invalid, calculate the current location of the wireless terminal in a self-positioning manner.

Optionally, in another implementation manner of this embodiment, the latency requirement on the collaborative positioning of the wireless terminal is relatively low, and the receiver 22 being specifically configured to determine an obtaining manner of the first collaborative positioning information according to the positioning latency parameter generated by the processor 21 specifically includes: when the positioning latency parameter generated by the processor 21 is greater than the first latency threshold, determining that the obtaining manner is the passive obtaining manner; and listening to the first collaborative positioning information that is broadcast by the neighboring terminal.

Similarly, in a specific implementation of this embodiment, the wireless terminal may perform subsequent positioning work according to validity of the obtained information, and a manner of determining, by the processor 21, whether the location information of the neighboring terminal is valid in this embodiment is similar to that in the foregoing embodiment, and the determining is performed before the calculator 23 calculates the current location of the wireless terminal. Accordingly, the calculator 23 is specifically configured to: when the processor 21 determines that the location information of the neighboring terminal included in the first collaborative positioning information obtained by the receiver 22 is valid, calculate the current location of the wireless terminal according to the location information of the neighboring terminal obtained by the receiver 22; or the calculator 23 is specifically configured to: when the processor 21 determines that the location information of the neighboring terminal included in the first collaborative positioning information obtained by the receiver 22 is invalid, determine that the obtaining manner of the first collaborative positioning information is the active obtaining manner, and the processor 21 in this embodiment is further configured to obtain the first collaborative positioning information in the active obtaining manner determined by the calculator 23, by using the selected wireless communications technology.

In a specific implementation, in this embodiment, a time when the wireless terminal obtains the first collaborative positioning information may be further limited. Specifically, a time when the wireless terminal obtains, through listening, the first collaborative positioning information that is broadcast by the neighboring terminal and a time when the wireless terminal receives the collaborative positioning response message that is fed back by the neighboring terminal may be limited. Specifically, a time threshold may be set in the system of the wireless terminal. If a timeout occurs, the collaborative positioning may be continued. If a timeout does not occur, the work of obtaining the first collaborative positioning information may be performed repeatedly.

Further, the transmitter 24 of the wireless terminal provided in this embodiment is further configured to: after the calculator 23 calculates the current location of the wireless terminal, broadcast second collaborative positioning information, where the second collaborative positioning information is used by the neighboring terminal to perform collaborative positioning.

Still further, based on the foregoing embodiment, in the wireless terminal provided in this embodiment, the positioning request information generated by the processor 21 may further include an update frequency parameter, and the processor 21 is further configured to: before selecting the wireless communications technology, determine, according to at least one of the generated positioning precision parameter, positioning latency parameter, or update frequency parameter, or a self-positioning capability of the wireless terminal, whether collaborative positioning or self-positioning is to be performed. Accordingly, the processor 21 being further configured to select a wireless communications technology according to the positioning precision parameter specifically includes: when the processor 21 determines that the collaborative positioning is to be performed, selecting the wireless communications technology according to the generated positioning precision parameter.

The wireless terminal provided in this embodiment may choose, according to a specific requirement of the currently running APP, whether to perform collaborative positioning or self-positioning, and advantages and limitations of the collaborative positioning and the self-positioning can be comprehensively considered, to provide a positioning manner that is more suitable for the APP that is currently running in the wireless terminal.

In a specific implementation, a condition under which the processor 21 determines that the collaborative positioning is to be performed may include: The wireless terminal does not have the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold. It should be noted that, when the wireless terminal determines that the collaborative positioning is to be performed, requirements on the positioning precision parameter, the positioning latency parameter, and the update frequency parameter are in an "and" relationship; in other words, when the wireless terminal has the self-positioning capability, as long as the positioning precision parameter is less than or equal to the second precision threshold, the positioning latency parameter is less than or equal to the second latency threshold, or the update frequency parameter is greater than the frequency threshold, the wireless terminal determines that the self-positioning is to be performed.

The wireless terminal provided in this embodiment of the present disclosure is configured to execute the collaborative positioning methods provided in the embodiments shown in FIG. 3 to FIG. 5 in the present disclosure, and has corresponding physical apparatuses. The implementation principles and technical effects thereof are similar. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A collaborative positioning method, comprising:
generating, by a wireless terminal, positioning request information, wherein the positioning request information comprises a positioning precision parameter;
selecting, by the wireless terminal, a wireless communications technology according to the positioning precision parameter, wherein the wireless communications technology selected by the wireless terminal is a communications manner used by the wireless terminal to perform collaborative positioning;
obtaining, by the wireless terminal according to the selected wireless communications technology, first collaborative positioning information sent by a neighboring terminal, wherein the first collaborative positioning information comprises: location information of the neighboring terminal, a location uncertainty of the neighboring terminal, and a signal strength of the first collaborative positioning information; and
calculating, by the wireless terminal, a current location of the wireless terminal according to the location information of the neighboring terminal, wherein the calculating the current location of the wireless terminal comprises:
calculating, by the wireless terminal according to the location uncertainty of the neighboring terminal and the signal strength of the first collaborative positioning information, a weighting coefficient corresponding to the location information of the neighboring terminal; and
determining, by the wireless terminal according to the location information of the neighboring terminal and the corresponding weighting coefficient, that the current location of the wireless terminal is $$l = \sum_{i=0}^{N} \omega_i l_i,$$

wherein $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

2. The method according to claim 1, wherein a communication range of the wireless communications technology selected by the wireless terminal is less than a difference between the positioning precision parameter and a preset first precision threshold.

3. The method according to claim 1, wherein the positioning request information further comprises a positioning latency parameter, and the obtaining, by the wireless terminal according to the selected wireless communications technology, the first collaborative positioning information sent by the neighboring terminal comprises:
determining, by the wireless terminal, an obtaining manner of the first collaborative positioning information according to the positioning latency parameter; and
obtaining, by the wireless terminal, the first collaborative positioning information in the obtaining manner determined by the wireless terminal according to the selected wireless communications technology, wherein the obtaining manner comprises one of an active obtaining manner and a passive obtaining manner.

4. The method according to claim 3, wherein the determining, by the wireless terminal, the obtaining manner of the first collaborative positioning information according to the positioning latency parameter comprises:
when the positioning latency parameter is less than or equal to a preset first latency threshold, determining, by the wireless terminal, that the obtaining manner is the active obtaining manner;

wherein the obtaining, by the wireless terminal, the first collaborative positioning information in the determined obtaining manner according to the selected wireless communications technology comprises:
- broadcasting, by the wireless terminal, a collaborative positioning request message, so that the neighboring terminal sends a collaborative positioning response message according to the collaborative positioning request message; and
- receiving, by the wireless terminal, the collaborative positioning response message, wherein the collaborative positioning response message comprises the first collaborative positioning information.

5. The method according to claim 4, wherein the calculating, by the wireless terminal, the current location of the wireless terminal according to the location information of the neighboring terminal comprises:
- when the location information of the neighboring terminal comprised in the first collaborative positioning information is valid, calculating, by the wireless terminal, the current location of the wireless terminal according to the location information of the neighboring terminal; or
- when the location information of the neighboring terminal comprised in the first collaborative positioning information is invalid, calculating, by the wireless terminal, the current location of the wireless terminal in a self-positioning manner.

6. The method according to claim 3, wherein the determining, by the wireless terminal, the obtaining manner of the first collaborative positioning information according to the positioning latency parameter comprises:
- when the positioning latency parameter is greater than a first latency threshold, determining, by the wireless terminal, that the obtaining manner is the passive obtaining manner;

wherein the obtaining, by the wireless terminal, the first collaborative positioning information in the determined obtaining manner according to the selected wireless communications technology comprises:
- listening, by the wireless terminal, to the first collaborative positioning information that is broadcast by the neighboring terminal; and wherein the calculating, by the wireless terminal, the current location of the wireless terminal according to the location information of the neighboring terminal comprises:
- when the location information of the neighboring terminal comprised in the first collaborative positioning information is valid, calculating, by the wireless terminal, the current location of the wireless terminal according to the location information of the neighboring terminal; or
- when the location information of the neighboring terminal comprised in the first collaborative positioning information is invalid, determining, by the wireless terminal, that the obtaining manner of the first collaborative positioning information is the active obtaining manner, obtaining the first collaborative positioning information in the active obtaining manner according to the selected wireless communications technology, and then determining the current location of the wireless terminal.

7. The method according to claim 1, wherein after the calculating the current location of the wireless terminal, the method further comprises:
- broadcasting, by the wireless terminal, second collaborative positioning information, wherein the second collaborative positioning information is used by the neighboring terminal to perform collaborative positioning.

8. The method according claim 1, wherein the positioning request information further comprises an update frequency parameter, and before the selecting, by the wireless terminal, the wireless communications technology according to the positioning precision parameter, the method further comprises:
- determining, by the wireless terminal according to at least one of the positioning precision parameter, the positioning latency parameter, the update frequency parameter, and a self-positioning capability of the wireless terminal, whether collaborative positioning or self-positioning is to be performed;

wherein the selecting, by the wireless terminal, the wireless communications technology according to the positioning precision parameter comprises:
- when determining that the collaborative positioning is to be performed, selecting, by the wireless terminal, the wireless communications technology according to the positioning precision parameter.

9. The method according to claim 8, wherein a condition under which the wireless terminal determines that the collaborative positioning is to be performed comprises:
- the wireless terminal not having the self-positioning capability; or
- when the wireless terminal has the self-positioning capability, the positioning precision parameter is greater than a preset second precision threshold, the positioning latency parameter is greater than a preset second latency threshold, and the update frequency parameter is less than or equal to a preset frequency threshold.

10. The method according to claim 1, wherein the wireless communications technology comprises a mobile cellular communications technology, a Wireless-Fidelity (Wi-Fi) technology, or a Bluetooth technology.

11. A wireless terminal, comprising:
a processor, configured to:
- generate positioning request information, wherein the positioning request information comprises a positioning precision parameter; and
- select a wireless communications technology according to the positioning precision parameter, wherein the wireless communications technology selected by the processor is a communications manner used by the wireless terminal to perform collaborative positioning; and a receiver, configured to obtain, according to the wireless communications technology selected by the processor, first collaborative positioning information sent by a neighboring terminal, wherein the first collaborative positioning information comprises location information of the neighboring terminal, a location uncertainty of the neighboring terminal, and a signal strength of the first collaborative positioning information; and wherein the processor is further configured to calculate a current location of the wireless terminal according to the location information of the neighboring terminal, wherein the calculating the current location of the wireless terminal comprises:
- calculating, by the wireless terminal according to the location uncertainty of the neighboring terminal and the signal strength of the first collaborative positioning information, a weighting coefficient corresponding to the location information of the neighboring terminal; and determining, by the wireless terminal according to the location information of the neighboring terminal and the corresponding weighting coefficient, that the current location of the wireless terminal is $$l = \sum_{i=0}^{N} \omega_i l_i,$$

wherein $l_i$ is location information of an $i^{th}$ neighboring terminal, $\omega_i$ is a weighting coefficient corresponding to the location information of the $i^{th}$ neighboring terminal, and N is a positive integer and represents a quantity of neighboring terminals.

12. The wireless terminal according to claim 11, wherein a communication range of the wireless communications technology selected by the processor is less than a difference between the positioning precision parameter and a preset first precision threshold.

13. The wireless terminal according to claim 11, wherein the positioning request information generated by the processor further comprises a positioning latency parameter;
wherein the processor is further configured to: determine an obtaining manner of the first collaborative positioning information according to the positioning latency parameter generated; and
wherein the receiver is further configured to: obtain the first collaborative positioning information in the obtaining manner according to the wireless communications technology selected by the processor, wherein the obtaining manner comprises one of an active obtaining manner and a passive obtaining manner.

14. The wireless terminal according to claim 13, wherein determining the obtaining manner of the first collaborative positioning information according to the positioning latency parameter comprises:
when the positioning latency parameter is less than or equal to a preset first latency threshold, determining that the obtaining manner is the active obtaining manner;
wherein the wireless terminal further comprises:
a transmitter, configured to broadcast a collaborative positioning request message, so that the neighboring terminal sends a collaborative positioning response message according to the collaborative positioning request message, and
wherein the receiver is further configured to receive the collaborative positioning response message, wherein the collaborative positioning response message comprises the first collaborative positioning information.

15. The wireless terminal according to claim 14, wherein the processor is further configured to:
before calculating the current location of the wireless terminal according to the location information of the neighboring terminal obtained by the processor, determine whether the location information of the neighboring terminal comprised in the first collaborative positioning information obtained by the receiver is valid;
wherein when the location information of the neighboring terminal comprised in the first collaborative positioning information obtained by the receiver is valid, calculate the current location of the wireless terminal according to the location information of the neighboring terminal obtained by the processor;
wherein the location information of the neighboring terminal comprised in the first collaborative positioning information obtained by the receiver is invalid, calculate the current location of the wireless terminal in a self-positioning manner.

16. The wireless terminal according to claim 13, wherein the determining the obtaining manner of the first collaborative positioning information according to the positioning latency parameter comprises: when the positioning latency parameter is greater than the first latency threshold, determining that the obtaining manner is the passive obtaining manner; and listening to the first collaborative positioning information that is broadcast by the neighboring terminal;
wherein the processor is further configured to:
before calculating the current location of the wireless terminal according to the location information of the neighboring terminal, determine whether the location information of the neighboring terminal comprised in the first collaborative positioning information is valid;
when the processor determines that the location information of the neighboring terminal comprised in the first collaborative positioning information is valid, calculate the current location of the wireless terminal according to the location information of the neighboring terminal; and
obtain the first collaborative positioning information in the active obtaining manner according to the selected wireless communications technology.

17. The wireless terminal according to claim 13, wherein the determining the obtaining manner of the first collaborative positioning information according to the positioning latency parameter comprises: when the positioning latency parameter is greater than the first latency threshold, determining that the obtaining manner is the passive obtaining manner; and listening to the first collaborative positioning information that is broadcast by the neighboring terminal;
wherein the processor is further configured to:
before calculating the current location of the wireless terminal according to the location information of the neighboring terminal, determine whether the location information of the neighboring terminal comprised in the first collaborative positioning information is valid;
when the processor determines that the location information of the neighboring terminal comprised in the first collaborative positioning information is invalid, determine that the obtaining manner of the first collaborative positioning information is the active obtaining manner, and
obtain the first collaborative positioning information in the active obtaining manner according to the selected wireless communications technology.

18. The wireless terminal according to claim 11, wherein after the processor calculates the current location of the wireless terminal, the transmitter is further configured to:
broadcast second collaborative positioning information, wherein the second collaborative positioning information is used by the neighboring terminal to perform collaborative positioning.

19. The wireless terminal according to claim 11, wherein the positioning request information further comprises an update frequency parameter, and the processor is further configured to:

before selecting the wireless communications technology, determine, according to at least one of the generated positioning precision parameter, positioning latency parameter, or update frequency parameter, or a self-positioning capability of the wireless terminal, whether collaborative positioning or self-positioning is to be performed;

wherein selecting the wireless communications technology according to the positioning precision parameter comprises: when the processor determines that the collaborative positioning is to be performed, selecting the wireless communications technology according to the positioning precision parameter.

20. The wireless terminal according to claim 19, wherein a condition under which the processor determines that the collaborative positioning is to be performed comprises:

the wireless terminal not having the self-positioning capability; or when the wireless terminal has the self-positioning capability, the positioning precision parameter is greater than a preset second precision threshold, the positioning latency parameter is greater than a preset second latency threshold, and the update frequency parameter is less than or equal to a preset frequency threshold.

21. The wireless terminal according to claim 11, wherein the wireless communications technology selected by the processor comprises a mobile cellular communications technology, a Wireless-Fidelity (Wi-Fi) technology, or a Bluetooth technology.

* * * * *